United States Patent [19]
Pedretti et al.

[11] Patent Number: 5,248,753
[45] Date of Patent: Sep. 28, 1993

[54] THERMOTROPIC COPOLYESTERAMIDE, PROCESS FOR ITS PREPARATION AND UTILIZATION

[75] Inventors: Ugo Pedretti; Arnaldo Roggero, both of Milan; Francesco P. La Mantia, Palermo; Enrico Montani, Milan; Pierluigi Magagnini, Pisa, all of Italy

[73] Assignee: Eniricerche, S.p.A., Milan, Italy

[21] Appl. No.: 612,513

[22] Filed: Nov. 13, 1990

[30] Foreign Application Priority Data

Nov. 22, 1989 [IT] Italy ................. 22484A/89

[51] Int. Cl.$^5$ ............. C08G 63/00; C08G 63/02; C08G 63/18
[52] U.S. Cl. ........................ 528/183; 528/176; 528/190; 528/193; 528/194
[58] Field of Search ............. 528/176, 183, 190, 193, 528/194

[56] References Cited

U.S. PATENT DOCUMENTS 4,833,229  5/1989  Magagnini et al. ............. 528/193
5,030,703  7/1991  Pielartzik et al. ............. 528/176

FOREIGN PATENT DOCUMENTS 298883  1/1989  European Pat. Off. .

OTHER PUBLICATIONS

Yumiko Kumazawa, Chemical Abs., vol. 13, No. 221, (C-598)(3569), May 23, 1989, Copolyester, Copolyester-Amide and Production of Injection-Moldable Material Prepared Therefrom.

Primary Examiner—John Kight, III
Assistant Examiner—T. Mosley
Attorney, Agent, or Firm—Hedman, Gibson & Costigan

[57] ABSTRACT

A thermotropic copolyesteramide, with a nematic structure of the liquid crystalline phase within a desired temperature range of the mesophase, contains a unit derived from: (a) a saturated $\alpha, \omega$-dicarboxylic acid; (b) 4,4'-dihydroxydiphenyl; (c) p-aminobenzoic acid; (d) 2,6-dihydroxyriaphthoic acid.

A copolyesteramide of this type exhibits improved characteristics, especially in regard to its elastic modulus and tensile strength, when used as a self-reinforced material or as a reinforcement material for traditional thermoplastic polymers.

12 Claims, 3 Drawing Sheets

THERMOTROPIC COPOLYESTERAMIDE, PROCESS FOR ITS PREPARATION AND UTILIZATION

DESCRIPTION

The present invention relates to a thermotropic copolyesteramide and a process for its preparation. The invention also relates to the use of such thermotropic copolyesteramides as self-reinforced materials or reinforcement materials for traditional thermoplastic polymers.

Polymers are known to the art which are capable of maintaining a high degree of intermolecular order in the liquid state and exhibit a behaviour pattern characteristic of a crystalline liquid. Two categories of such polymers are known, namely lyotropic polymers, which give rise to ordered systems in solution, and thermotropic polymers which give rise to ordered systems in the molten state.

Many thermotropic polymers of a polyester type are known), having a completely aromatic structure.

Some thermotropic polymers of the polyester type are also known to the art, in the chains of which rigid units (of an aromatic type) are interlinked by flexible segments (of an aliphatic type), such as thermotropic polyesters containing in the macromolecule, units derived from a saturated aliphatic dicarboxylic acid and from 4,4'-dihydroxydiphenyl, described by Asrar et al in the Journal of Polymer Science, Polymer Edition, 1983 21 119, and by Krigbaum et al in Macromolecules, 1983, 16 1271.

U.S. Pat. No. 4,833,229 contains a description of a thermotropic copolyester containing in its macromolecule, units derived from p-hydroxybenzoic acid in combination with derivatives of a saturated aliphatic dicarboxylic acid and 4,4'-dihydroxydiphenyl. U.S. Pat. No. 4.963.642 granted on Oct. 16,1990 contains a description of a thermotropic copolyester containing in its macromolecule units derived from a saturated aliphatic dicarboxylic acid, 4,4'-dihydroxydiphenyl, p-hydroxybenzoic acid and 2,6-hydroxynaphthoic acid. These thermotropic copolyesters known to the art can be used as self-reinforced materials or as reinforcement materials for conventional thermoplastic polymers such as polyethylene terephthalate, polybutylene terephthalate, polycarbonate and nylon.

It has been found according to the present invention that the replacement of units derived from p-hydroxybenzoic acid by units derived from p- aminobenzoic acid in the macromolecular chains of the copolyester described in the U.S. Pat. No. 4,833,229 referred to above, yields a copolyesteramide which constitutes a new and useful material. It has been found, in particular, that a copolyesteramide of this type possesses thermotropic characteristics within a desired temperature range of the mesophase and that the use of such a self-reinforced or reinforcement material imparts unexpectedly improved characteristics, especially in regard to the elasticity modulus and the tensile breaking strength. The present invention accordingly relates, in a first embodiment, to a thermotropic copolyesteramide having a nematic structure of the liquid crystalline phase within the temperature range from 1500° to 3000° C. and containing in the macromolecule units derived from:

(2) a saturated aliphatic α-ω-dicarboxylic acid:

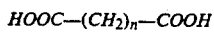

(b) 4,4'-dihydroxydiphenyl:

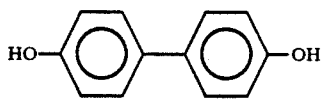

(c) p-aminobenzoic acid:

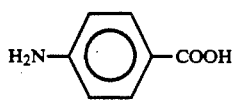

(d) 2,6-hydroxynaphthoic acid:

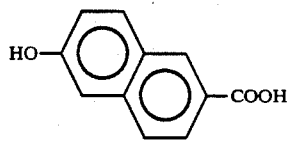

with the following ratios between the units:

$(a)/(b) = 1/1$;

$[(c)+(d)]/(a) = $ from 0.5/1 to 7/1;

$(d)/[(c)+(d)] = $ from 0.4/1 to 0.95/1.

The thermotropic copolyesteramide has preferably the following ratios between the units:

$(a)/(b) = 1/1$;

$[(c)+(d)]/(a) = $ from 0.5/1 to 4/1;

$(d)/[(c)+(d)] = $ from 0.3/1 to 0.8/1.

The copolyesteramide according to the present invention may be obtained by the copolymerization in the molten state of a mixture of saturated aliphatic α,ω-dicarboxylic acid, 4,4'-diacyloxydiphenyl, 4-acylaminobenzoic acid and 2,6-acyloxybenzoic acid. The preferred acyl derivative is the acetyl one. Examples of saturated, aliphatic α,ω-dicarboxylic acids (a), useful for purposes of the present invention, are suberic acid, sebacic acid and adipic acid. Preference is given among these three to sebacic acid.

The copolymerization reaction is carried out in the presence of catalysts such as tin dialkyloxides, tin diaryloxides, titanium dioxide, antimony dioxide and metallic alkaline or alkaline earth carboxylates. The preferred catalyst is sodium acetate. It is in general of advantage to use a quantity of catalyst varying between 0.01 and 1 parts by weight per 100 parts by weight of the monomers undergoing copolymerization.

Copolymerization is carried out by heating the mixture to about 210°–220° C., then raising the temperature progressively to values of the order of 3100° C. and preferably to values of the order of 290° C.

During copolymerization carboxylic acid is evolved corresponding to the acyl function introduced into the mixture, and in particular the acetic acid, where the acyl function is the acetyl function which is removed from the reaction mixture. It is advantageous to operate at a reduced pressure, at least during the final period of copolymerization in order to eliminate the carboxylic acid reaction byproduct and any other components of low molecular weight, so as to increase the degree of polymerization to the required level. The time required for polymerization may vary from 3 to 11 hours being preferably of the order of 5–7 hours.

For purposes of the copolymerization reaction, the copolyesteramide may undergo purification, for example by prolonged extraction to boiling with organic solvents or by precipitation of the solutions in organic solvents.

The copolyesteramide thus obtained has inherent viscosity values between 1 and 5 dl/g, when determined at 60° C. in a pentafluorophenol solution at a concentration of 0.1 g/dl.

Characterization of the copolyesteramide is carried out on samples in powder form by X-ray diffraction, using a vertical Philips goniometer, equipped for electronic pulse counting and using the Cu $K_{\bar{\alpha}}$ radiation.

Figure 3:
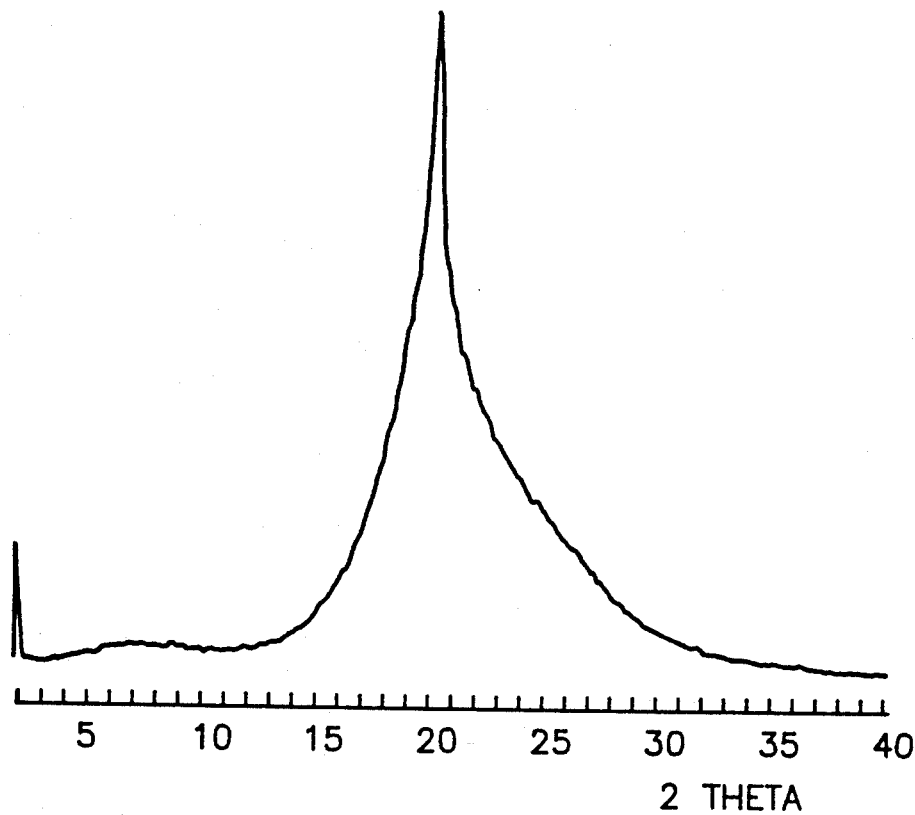
FIG. 3 depicts in graphic form the x-ray diffraction spectrum for the copolyesteramide obtained in Example 3.
Figure 4:
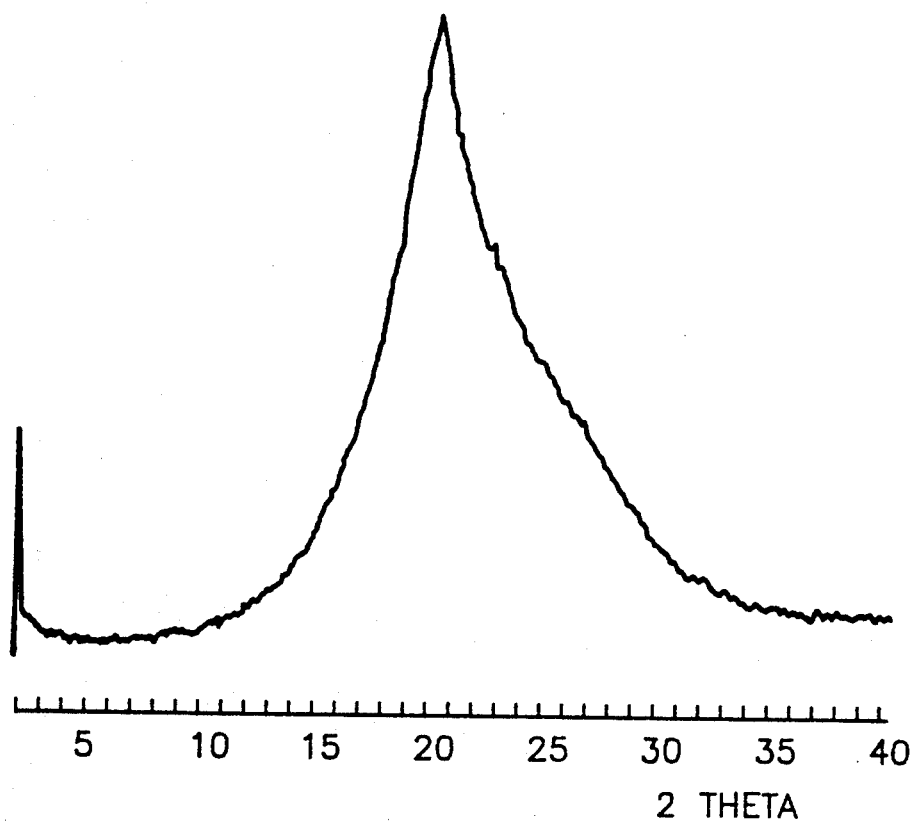
FIG. 4 depicts in graphic form the x-ray diffraction spectrum for the copolyesteramide obtained in Example 4.
Figure 5:
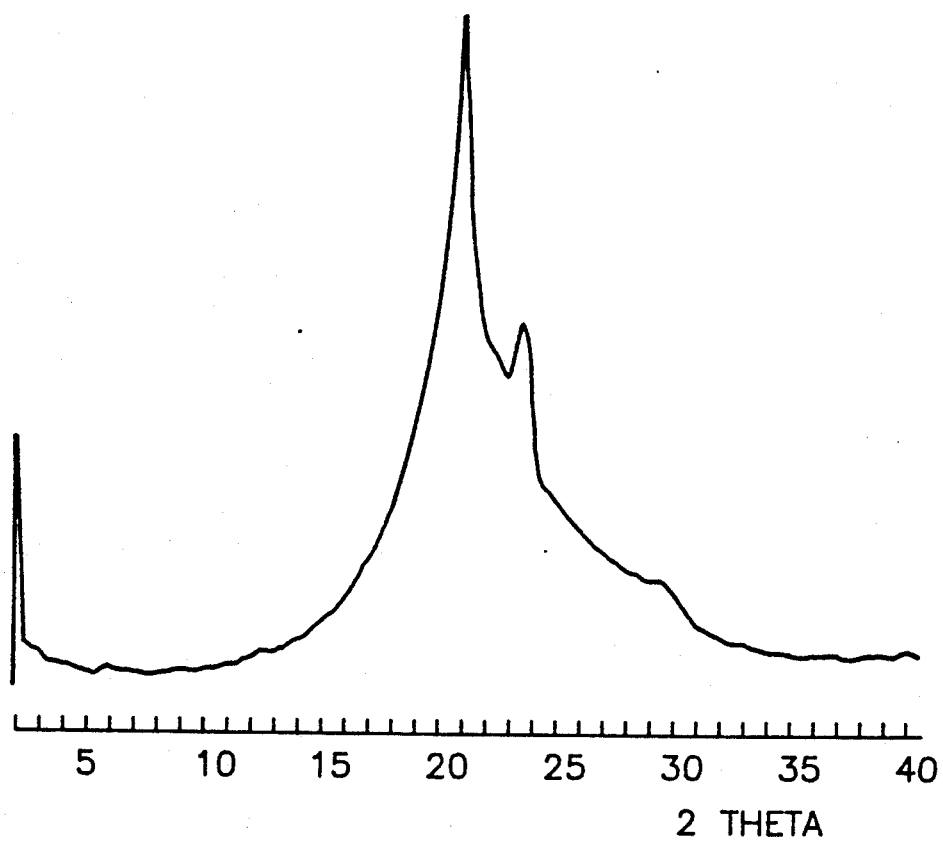
FIG. 5 depicts in graphic form the x-ray diffraction spectrum for copolyesteramide of the present invention having particular component ratios.

The X-ray diffraction spectrum mainly characteristic of the present compound yields a single very intense and relatively widened peak in the $2\theta$ angular section between 19° and 21° (FIGS. 1 to 4). The angular position of this peak varies slightly with variation of the composition of the copolyesteramide and a displacement toward low angles is known in particular in the case of an increase in the concentration of units (c) and (d). The spectra of copolyesteramides with ratios $[(c)+(d)]/(a)>4$ and $(d)/[(c)+(d)]<3$ are shown to possess, in addition to the intensive peak referred to above, reflections characteristic of the crystalline sequences of unit (c) (FIG. 5).

The thermotropic copolyesteramide of the present invention has a crystal/nematic mesophase transition point at 150°–230° C., depending on its composition. The nematic mesophase/isotropic state transition point is in all cases over 3200° C. The crystal/nematic mesophase and nematic mesophase/isotropic state transitions are determined by differential scanning calorimetry (DSC), using a Mettler TA 4000 instrument and by polarized light optical microscope, fitted with a heating table.

The thermotropic copolyesteramide of the present invention, which combines all the characteristics listed above, may be subjected to temperatures below the melting point under reduced pressure, preferably in an inert and anhydrous gasflow. More particularly, this heat treatment may be carried out at 130°–210° C. and at pressures up to $10^{-4}$ torr and for periods generally variable between 1 and 20 hours. Under this heat treatment, the crystal/nematic mesophase transition of the copolyesteramide increases gradually with an increase in the treatment time, finally reaching a constant or broadly constant value.

The maximum increase in the transition point is of the order of 40° C. The copolyesteramide treated in this way has in general inherent viscosity values of the order of 5 dl/g, determined at 60° C. in pentafluorophenol solution at a concentration of 0.1 g/dl. The heat treatment will probably induce an increase in the mean molecular weight of the copolyesteramide.

The thermotropic copolyesteramide of the present invention may be processed by the usual working technologies such as injection pressing, extrusion and spinning. Extrusion techniques can induce preferred orientations in the direction of flow, which are increased by drawing. In terms of its mechanical strength characteristics, the extruded and drawn copolyesteramide has a stretching modulus of 40–80 GPa and tensile breaking strengths of 700–1200 MPa.

The thermotropic copolyesteramide of the present invention may also be used as a reinforcement agent for conventional thermoplastic materials such as polycarbonates, polyethylene terephthalates, polybutylene terephthalates and nylon, used in concentrations of 5–30 parts by weight copolyesteramide per 100 parts per weight thermoplastic polymer. The improvement in the mechanical characteristics of the thermoplastic material as a result of the addition of the copolyesteramide amounts to about 10–50% both for the elasticity modulus and the tensile strength. Addition of the copolyesteramide causes a significant reduction in the viscosity of the mixture, thus enabling polymer spinning to be carried out at about 10–200 lower than the temperature normally required for processing of the thermoplastic polymer and also exploiting the hot drawing step to its best.

The experimental examples set out below provide a better illustration of the present invention.

EXAMPLE 1

The following materials are introduced into a 2 liter reactor vessel, fitted with a very high-torque stirrer, a mechanical seal, capable of operating under a slight pressure or under a high vacuum, a nitrogen injection tube and a condenser:

| | | |
|---|---|---|
| sebacic acid | 121.2 g | (0.6 mol) |
| 4,4'-diacetoxydiphenyl | 162.0 g | (0.6 mol) |
| 4-acetylaminobenzoic acid | 107.4 g | (0.6 mol) |
| 2,6-acetoxynaphthoic acid | 276.0 g | (1.2 mol) |
| sodium acetate | 0.65 g | (0.0078 mol) |

The mixture is heated to 2200° C. in a molten salt bath, at which temperature complete melting of the reagent mixture has been obtained, under a gentle nitrogen flow. The reaction temperature is raised to 2900° C. over a period of 3 hours, during which the acetic acid is distilled and condensed in a test tube which is held at $-78°$ C. with dry ice. During this period the viscosity of the molten material increases gradually and the stirring speed is reduced at the same time. The nitrogen flow is then disconnected and the molten material subjected to pressure reduction until a final value of $10^{-2}$ mm Hg is reached. The reaction is continued under these conditions for a further 3 hours. Cooling is then continued, still under vacuum, until ambient temperature is reached.

Figure 1:
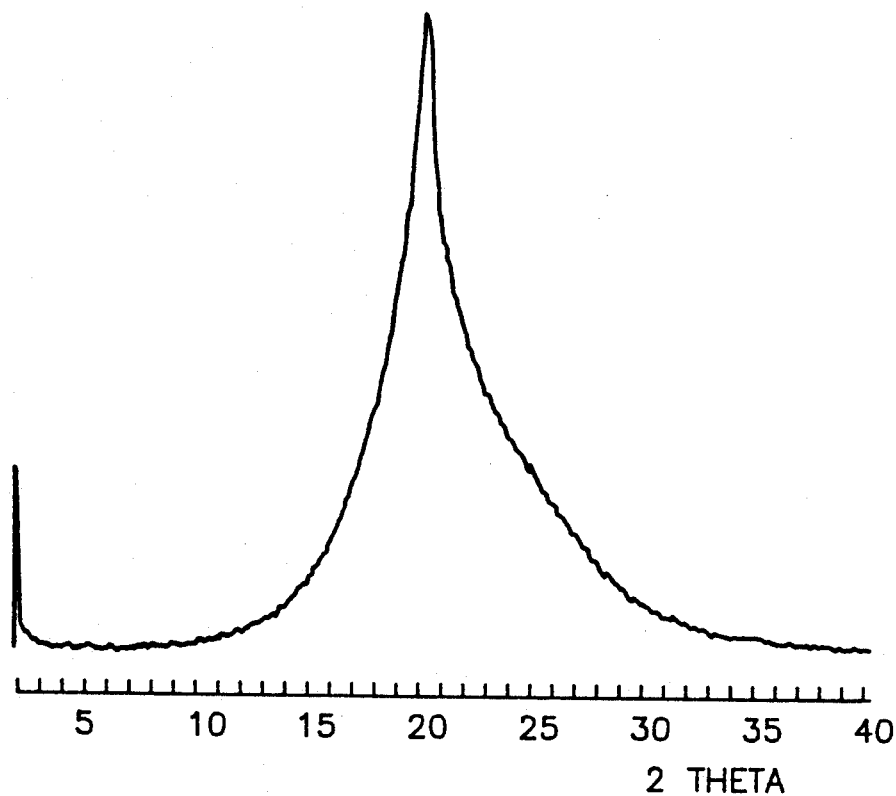
FIG. 1 depicts in graphic form the X-ray diffraction spectrum for the copolyesteramide obtained in Example 1.

After mixing with dry ice, the copolyesteramide thus obtained undergoes fine machining in a blade mill. The copolyesteramide has an inherent viscosity (IV) of the order of 2.5 dl/g, determined at 60° C. in pentafluorophenol solution at a concentration of 0.1 g/dl. Its crystal/nematic mesophase transition point is located at 184° C. (determined by DSC) and its X-ray diffraction spectrum is shown in FIG. 1.

EXAMPLE 2

The following materials are introduced into the reactor vessel of Example 1:

| sebacic acid | 121.2 g | (0.6 mol) |
|---|---|---|
| 4,4'-diacetoxydiphenyl | 162.0 g | (0.6 mol) |
| 4-acetylaminobenzoic acid | 53.7 g | (0.3 mol) |
| 2,6-acetoxynaphthoic acid | 138.0 g | (0.6 mol) |
| sodium acetate | 0.47 g | (0.0056 mol) |

Figure 2:
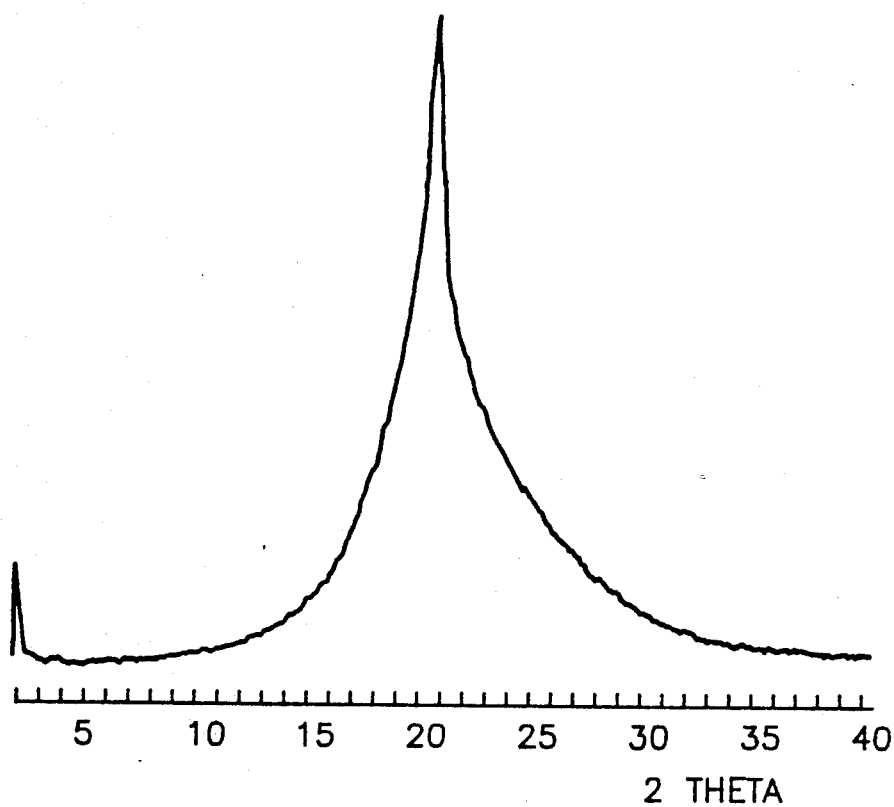
FIG. 2 depicts in graphic form the x-ray diffraction spectrum for the copolyesteramide obtained in Example 2.

The operations described in Example 1 yield a copolyesteramide having an inherent viscosity (IV) of the order of 1.8 dl/g (determined at 60° C. in a 0.1 g/dl pentafluorophenol solution), with a crystal/nematic mesophase transition point at 195° C. (determined by DSC) and an X-ray diffraction spectrum which is shown in FIG. 2.

EXAMPLE 3

The following materials are introduced into the reactor of Example 1:

| sebacic acid | 121.2 g | (0.6 mol) |
|---|---|---|
| 4,4'-diacetoxydiphenyl | 162.0 g | (0.6 mol) |
| 4-acetylaminobenzoic acid | 53.7 g | (0.3 mol) |
| 2,6-acetoxynaphthoic acid | 276.0 g | (1.2 mol) |
| sodium acetate | 0.61 g | (0.0073 mol) |

The operations described in Example 1 yield a copolyesteramide having an inherent viscosity (IV) of the order of 1.5 dl/g (determined at 600° C. in a 0.1 g/dl pentafluorophanol solution), with a crystal/nematic mesophase transition point at 163° C. (determined by DSC) and an X-ray diffraction spectrum which is shown in FIG. 3.

EXAMPLE 4

The following materials are introduced into the reactor vessel of Example 1:

| sebacic acid | 121.2 g | (0.6 mol) |
|---|---|---|
| 4,4'-diacetoxydiphenyl | 162.0 g | (0.6 mol) |
| 4-acetylaminobenzoic acid | 214.8 g | (1.2 mol) |
| 2,6-acetoxynaphthoic acid | 486.0 g | (1.8 mol) |
| sodium acetate | 0.98 g | (0.012 mol) |

The operations described in Example 1 yield a copolyesteramide having an inherent viscosity (IV) of the order of 1.2 dl/g (determined at 60° C. in a 0.1 g/dl pentafluorophenol solution), with a crystal/nematic mesophase transition point at 180° C. (determined by DSC) and an X-ray diffraction spectrum which is shown in FIG. 4.

EXAMPLE 5

The copolyesteramide obtained by the procedure described in Example 1 undergoes a spinning and drawing process, using a Ceast Rheoscope 1000 viscometer fitted with a tensile module and a conical nozzle having a half-angle of 30° C. and a diameter of 1 mm. The operation is carried out at 260° C. and at a drawing ratio within the range from 10 to 150.

The fibre thus obtained has a stretching module between 30 and 70 GPa, a tensile strength between 500 and 1000 MPa and elongation at break between 3% and 2%.

The mechanical characteristics are determined with a model 6025 Instron instrument having a velocity gradient of 0.5 min$^{-1}$.

EXAMPLE 6

The copolyesteramide obtained by the procedure described in Example 1 undergoes a spinning and drawing process, using a Ceast Rheoscope 1000 viscometer fitted with a tensile module and a conical nozzle having a half-angle of 30° and a diameter of 1 mm. The operation is carried out at 230° C. and at a drawing ratio within the range from 200 to 1000.

The fibre thus obtained has a stretching module between 30 and 50 GPa, a tensile strength between 500 and 700 MPa and elongation at break between 3% and 2%.

The mechanical characteristics are determined with a model 6025 Instron instrument having a velocity gradient of 0.5 min$^{-1}$.

EXAMPLE 7

The copolyesteramide obtained by the procedure described in Example 1 and nylon-6 in a weight ratio of 20:80 are mixed in the molten state in a Brabender mixer at 240° C. The mixture thus obtained undergoes fine machining in the presence of dry ice and, after drying for 4 hours at 140° C. in an air-circulation furnace, undergoes compression moulding at 240° C. for 5 min, at a pressure of 100 MPa.

The product thus obtained has a stretching modulus of 1.75 GPa and a tensile breaking strength of 80 MPa, representing a 13% increase over nylon-6 in the natural state. The elongation at break is 15%.

We claim:

1. A thermotropic copolyesteramide having a nematic structure of a liquid crystalline phase at temperatures ranging from 150° to 320° C., comprising in the macromolecule units derived from:

(a) a saturated aliphatic α,ω-dicarboxylic acid of the formula:

wherein n varies from 3 to 8;

(b) 4,4'-dihydroxydiphenyl:

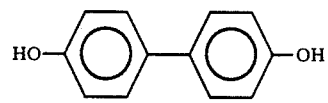

(c) p-aminobenzoic acid:

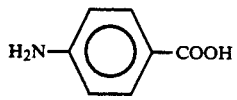

(d) 2,6-hydroxynaphthoic acid:

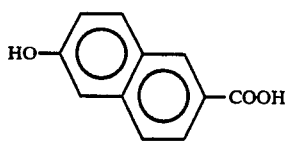

having the following unit ratios:

(a)/(b) = 1/1;

((c)+(d))/(a) = from [0,5/1] 0.5/1 to 7/1;

and (d)/((c)+(d)) = from [0,3/1] 0.3/1 to [0,95/1] 0.95/1.

2. A copolyesteramide according to claim 1, having the following ratios between the constituent units:

(a)/(b) = 1/1;

((c)+(d))/(a) = from 0.5/1 to 4/1;

and (d)/((c)+(d)) = from 0.3/1 to 0.8/1.

3. A copolyesteramide according to claim 1 wherein (a) is selected from the group consisting of suberic acid, sebacic acid and adipic acid.

4. A copolyesteramide according to claim 1, having an inherent viscosity between 1 and 5 dl/g, determined at 60° C. in pentafluorophenol solution at a concentration of 0.1 g/dl.

5. A process for the preparation of a copolyesteramide according to claim 1, comprising mixing in the molten state saturated aliphatic α,ω-dicarboxylic acid, 4,4'-diacyloxydiphenyl, 4-acylaminobenzoic acid and 2,6-acyloxybenzoic acid, in the presence of a catalyst selected from tin dialkyloxides, tin diaryloxides, titanium dioxide, antimony dioxide and metallic alkaline or alkaline earth carboxylates, in quantities varying between 0.01 and 1 part by weight per 100 parts by weight copolymerized monomers, copolymerizing by heating the mixture to about 210°-220° C. and raising the temperature progressively up to about 310° C., continuing the operation for between 3 and 11 hours and removing the carboxylic acid byproduct of the reaction.

6. A process according to claim 5, wherein said acyl monomer derivative is the acetyl derivative, the catalyst is sodium acetate, the mixing temperature of the reaction is progressively increased from about 210°-220° C. to about 290° C. over a period of the order of 5-7 hours and the acetic acid byproduct of the reaction is removed under a reduced pressure.

7. A process according to claim 5, wherein, on completion of polymerization, the copolyesteramide undergoes heat treatment at 130°-210° C., at a reduced pressure and in an inert gas atmosphere.

8. A self-reinforced fiber or pressed article comprising a copolyesteramide according to claim 1.

9. A thermoplastic polymer reinforcing material comprising a copolyesteramide according to claim 1.

10. A thermoplastic copolyesteramide having a nematic structure of a liquid crystalline phase at temperatures ranging from 150° to 320° C., consisting essentially of macromolecule units derived from:

(a) a saturated aliphatic α,ω-dicarboxylic acid of the formula:

$$HOOC-(CH_2)_n-COOH$$

wherein n varies from 3 to 8;

(b) 4,4'-dihydroxydiphenyl:

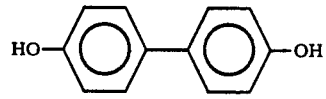

(c) p-aminobenzoic acid:

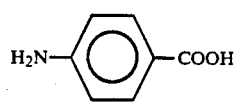

(d) 2,6-hydroxynaphthoic acid:

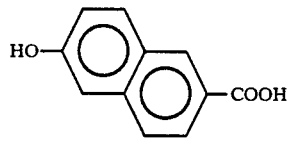

having the following unit ratios:

(a)/(b) = 1/1;

((c)+(d))/(a) = from 0.5/1 to 7/1;

and (d)/((c)+(d)) = from 0.3/1 to 0.95/1.

11. A copolyesteramide according to claim 3 wherein said component (a) comprises sebacic acid.

12. A thermoplastic copolyesteramide having a nematic structure of a liquid crystalline phase at temperatures ranging from 150° to 320° C., comprising macromolecule units derived from:

(a) a saturated aliphatic α,ω-dicarboxylic acid of the formula:

$$HOOC-(CH_2)_n-COOH$$

wherein n varies from 3 to 8;

(b) 4,4'-dihydroxydiphenyl:

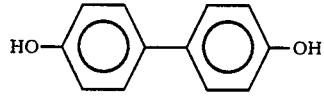

(c) p-aminobenzoic acid:

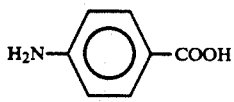
(d) 2,6-hydroxynaphthoic acid:
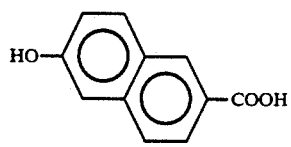
having the following unit ratios:
$(a)/(b) = 1/1$;
$((c)+(d))/(a) = $ from 0.5/1 to 7/1;
and
$(d)/((c)+(d)) = $ from 0.3/1 to 0.95/1;
and wherein component (a) is present in an amount ranging from about 14 to about 29 molar percent based on the total moles of (a)+(b)+(c)+(d).
* * * * *